Patented Dec. 12, 1950

2,533,629

UNITED STATES PATENT OFFICE 2,533,629

POLYSTYRENE PLASTIC FOAM

Fritz Rosenthal, Bellmawr, N. J., assignor to Radio Corporation of America, a corporation of Delaware No Drawing. Application April 18, 1945, Serial No. 589,101

8 Claims. (Cl. 260—2.5)

This invention relates to a plastic material, and more particularly to a plastic material which may be termed a plastic "foam" and which has a very low specific gravity and excellent dielectric properties.

There are many applications for materials which have both light weight and good electrical and heat insulating properties. For example, in buildings, refrigerators, and the like, a light weight material which is highly resistant to heat is very desirable. Similarly, a light weight, dielectric material is also very useful in many forms of electrical apparatus. Furthermore, light weight materials which have a high degree of buoyancy are also extremely useful, as in boats, life rafts, and so on.

The primary object of my present invention is to provide an improved composition of matter which is well adapted for use in the above named and many other fields.

More particularly, it is an object of my present invention to provide an improved thermoplastic, dielectric material which has an extremely low specific gravity, which is highly heat resistant, and which has excellent dielectric properties.

A further object of my present invention is to provide an improved composition of matter as above set forth which has great mechanical strength notwithstanding its very low specific gravity, which can readily be worked with conventional tools, and which can be handled safely without requiring the exercise of undue care.

Another object of my present invention is to provide an improved composition of matter of the type set forth above which is highly moisture proof and which is free from attack by the elements.

It is also an object of my present invention to provide an improved composition of matter as aforesaid which can be manufactured with considerable ease, which is relatively inexpensive in cost, and which is highly efficient in use in many fields.

Generally speaking, my present invention relates to what may be termed a plastic "foam" which is considerably lighter than rock wool, glass wool, cork or the like. The material is of a cellular structure and therefore is highly suitable as a heat insulating medium. Its dielectric properties compare most favorably with polystyrene, for example, so that it finds usefulness in electrical apparatus.

In accordance with my present invention, styrene is copolymerized with an olefin hydrocarbon in about 10 per cent of the weight of styrene, so that the hydrocarbon is in excess of that necessary to copolymerize with the styrene. The hydrocarbon is preferably of a type which dissolves in the styrene when under pressure but is readily transformed into a gas when the pressure is released. The polymerization is effected under heat and pressure and, when the polymerization has been completed, the pressure is reduced. This permits the excess hydrocarbon to gasify while entrapped in the material and to expand, the expanding gas causing the material to swell up, so to speak, into a cellular structure of very low specific gravity. If desired, the olefin hydrocarbon may be used in a quantity necessary to react with the styrene, and a separate material which will dissolve in the solution of the olefin in styrene and which will gasify and expand when the pressure is released may be employed to expand the polymerized product into a cellular structure.

The styrene may be copolymerized with any suitable mono-olefin hydrocarbon such as isobutylene, amylene, hexene, heptene, and the like. I have found that foam formation can be best obtained by employing a mono-olefin hydrocarbon which has not less than 4 nor more than 6 carbon atoms per molecule. If desired, ethylene may be employed to provide the gas necessary to expand the product into a cellular, light weight structure. The polymerization time, temperature, use of a catalyst in various concentrations, and the like vary with particular materials over a substantial range, and such conditions of operation may be chosen as are best suited for particular materials.

By way of example, reference is made to the following procedure for producing a plastic foam material which has been prepared in accordance with the present invention:

90 parts of monomeric styrene are mixed in solution with 10 parts of liquefied isobutylene. Ethylene gas is bubbled into this solution at a temperature slightly above the freezing point of styrene for about 20 minutes, and then 1 part of benzoyl peroxide is added as a catalyst. The mixture is sealed into a glass tube and heated in an oven at about 150° C. for approximately 20 days. By sealing up the glass, a relatively large pressure is maintained within it and the isobutylene (as well as the ethylene, if it is used) will remain in solution. Under this treatment, the material becomes polymerized to a water-clear solid which can be removed easily from the glass tube by exposing it to a colder temperature.

When the pressure is released, the excess isobutylene which did not enter into the reaction and/or the ethylene which was introduced into the solution will gasify, the gas being entrapped within the material. At room temperature, and at a pressure which is lower than that obtained during the reaction, the material will gradually swell to approximately three-fold size due to the expansion of the entrapped gas which forms the material into a cellular structure. I have found that the material will swell to more than thirty-fold size when exposed to a temperature range above the heat distortion point but below the softening point of the material. The resulting plastic, polystyrene "foam," will have a density of the order of one pound per cubic foot of material, although its density may vary from about three quarters of a pound to about two and one-half pounds per cubic foot of material. In any case, the resulting "foam" will be found to have great mechanical strength and excellent heat and electrical insulating properties. Such material can be readily worked mechanically with conventional tools and may be sawn, drilled, cut, nailed, glued to like and other materials, etc. The material is highly moisture proof and will not stick to other materials on which it may be supported when its temperature is reduced below the softening point. Furthermore, by reason of its very low specific gravity, it will readily float on water. These and many other desirable characteristics which it possesses render it useful in many fields of application.

Although I have described but one precise product according to my present invention and one particular manipulative procedure for preparing it, it will undoubtedly be apparent to those skilled in the art that variations in both are possible. Furthermore, while the particular product described above merely by way of example is water-white in color, it is apparent that it can be prepared in various colors or shades for decorative purposes, for example. Since various changes and modifications are possible within the spirit of my invention, I desire that the invention shall not be limited except insofar as is made necessary by the prior art and by the spirit of the appended claims.

I claim as my invention:

1. The method of producing a foam of plastic material which comprises polymerizing under heat and pressure a solution of about 90 percent styrene and about 10 percent of a mono-olefin hydrocarbon having not less than 4 nor more than 6 carbon atoms per molecule in the presence of a material which is soluble in said solution under said pressure and which is adapted to gasify at a relatively lower pressure, and then reducing said pressure whereby to cause said material to gasify and expand while being entrapped in said polymer, said expanding, entrapped gas causing said polymer to expand into a cellular structure.

2. The method set forth in claim 1 wherein said material is ethylene and in which a polymerization catalyst, benzoyl peroxide, is added to said solution.

3. A method of producing a foam of plastic material which comprises dissolving in about 90 parts of monomeric styrene about 10 parts of a normally gaseous mono-olefin hydrocarbon, said mono-olefin hydrocarbon having from 4 to 6 carbon atoms per molecule, polymerizing under heat and pressure said styrene and said mono-olefin hydrocarbon for a time insufficient to completely react said styrene and said mono-olefin, and then reducing the pressure whereby to cause the excess olefin hydrocarbon to gasify and expand while being entrapped in said polymer, said expanding, entrapped gas causing said polymer to expand into a cellular structure.

4. A method of producing a foam of plastic material which comprises dissolving in about 90 parts of monomeric styrene about 10 parts of a normally gaseous mono-olefin hydrocarbon, said mono-olefin hydrocarbon having from 4 to 6 carbon atoms per molecule, polymerizing under heat and pressure said styrene and said mono-olefin hydrocarbon for a time insufficient to completely react said styrene and said mono-olefin, reducing the pressure whereby to cause the excess mono-olefin hydrocarbon to gasify and expand while being entrapped in said polymer, and thereby partially expanding said polymer, and then heating said partially expanded polymer to a temperature which is above its heat distortion point but below its softening point, said expanding, entrapped gas causing said polymer to expand into a cellular structure having a density of the order of one pound per cubic foot.

5. A product comprising an expanded cellular body which is the reaction product produced by dissolving about 10 parts of a normally gaseous mono-olefin hydrocarbon having from 4 to 6 carbon atoms per molecule, in about 90 parts of monomeric styrene, polymerizing under heat and pressure said styrene and said mono-olefin hydrocarbon for a time insufficient to completely react said styrene and said mono-olefin, and then reducing the pressure whereby to cause the excess olefin hydrocarbon to gasify and expand while being entrapped in said polymer.

6. A product according to claim 5, said product having a density of the order of 1 pound per cubic foot.

7. A product according to claim 5 in which said mono-olefin hydrocarbon is isobutylene.

8. A product according to claim 5 in which said mono-olefin hydrocarbon is amylene.

FRITZ ROSENTHAL.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,395,086 | Van Gilder et al. | Feb. 19, 1946 |

FOREIGN PATENTS

| Number | Country | Date |
|---|---|---|
| 429,316 | Great Britain | May 28, 1935 |

OTHER REFERENCES

Sachs, Modern Plastics, December 1945, pages 173–176.